United States Patent [19]

Ferguson

[11] 4,130,099
[45] Dec. 19, 1978

[54] GAS SAVER
[76] Inventor: Russel O. Ferguson, 636 Richmond St., Dunedin, Fla. 33528
[21] Appl. No.: 775,975
[22] Filed: Mar. 9, 1977
[51] Int. Cl.² .......................................... F02M 29/00
[52] U.S. Cl. ............................ 123/141; 123/119 D; 261/79 R
[58] Field of Search ............ 123/119 D, 141, 119 DB; 48/180 A, 180 S; 261/79 R

[56] References Cited
U.S. PATENT DOCUMENTS

| | | | |
|---|---|---|---|
| 1,118,865 | 11/1914 | Johnston et al. | 123/119 D |
| 1,184,611 | 5/1916 | Boucher | 48/180 A |
| 2,146,246 | 2/1939 | Barnes | 48/180 A |
| 2,720,196 | 10/1955 | Wolf | 123/141 |
| 2,790,709 | 4/1957 | August | 48/180 A X |
| 3,437,467 | 4/1969 | Jacobus | 123/141 X |
| 3,564,580 | 2/1971 | Cinque | 123/119 D |

Primary Examiner—Ira S. Lazarus
Attorney, Agent, or Firm—Stein & Frijouf

[57] ABSTRACT

A gasoline saving device is disclosed for an internal combustion engine having a carburetor housing and a manifold housing, each housing having an internal orifice for passing a gasoline fluid. A substantially flat plate member is adapted for insertion between the carburetor housing and the manifold housing. The plate member comprises at least one aperture having a diameter in accordance with the diameter of the internal orifices of the carburetor housing and the manifold housing. The aperture in the plate member is registered relative to the internal orifices of the carburetor housing and the manifold housing. A plurality of fluid channels extend longitudinally through the plate member for providing fluid communication for an external fluid adjacent the outer surface of the plate member to the aperture in the plate member. A venturi is mounted in proximity to the aperture for drawing the external fluid through the fluid channels into the internal orifice of the manifold housing upon gasoline flow therein to mix the external fluid with the gasoline fluid. The invention may include a first and a second aperture with means for spinning the gasoline fluid in a clockwise direction in the first aperture and for spinning the gasoline fluid in a counter-clockwise direction in the second aperture. The foregoing abstract is merely a resume of one general application, is not a complete discussion of all principles of operation or applications, and is not to be construed as a limitation on the scope of the claimed subject matter.

11 Claims, 3 Drawing Figures

GAS SAVER

BACKGROUND OF THE INVENTION

1. Field of the Invention

This invention relates to internal combustion engines, and more particularly to internal combustion engines having additional fluid or air supply means.

2. Description of the Prior Art

The prior art is substantially saturated with apparati and devices for use with internal combustion engines for increasing the gasoline burning efficiency of the engine. These devices range from very simple to extremely complex devices with the predominant objective of providing a leaner burning internal combustion engine.

A majority of these apparati inject an external fluid into the flowing stream of gasoline and air within an internal orifice of the manifold housing of the internal combustion engine. Numerous types and amounts of fluids have been injected in the flowing gasoline fluid including the gaseous and liquid fluids. Water injectors have been well known in the art and have been used in an attempt to increase the efficiency of internal combustion engines. In addition, numerous devices have been developed for injecting a gas such as air into the flowing gasoline-air mixture. The secondary insertion of air into the gasoline-air fluid provides a more uniform gasoline-air vapor to provide a more complete combustion and consequently, more efficiency.

Unfortunately, none of the prior art air injection devices have found widespread use or application in the art. Most of the prior art air injection devices do not mix the gas-air vapor with the injected air and accordingly did not improve the combustion of the internal combustion engine. Other more sophisticated devices overcame these problems, but were difficult to install and were adaptable only to a limited number of carburetor devices. Other air injection devices required the substantial modification to either the carburetor or the manifold housing by an expert during the installation of the gas saving device. As a consequence of the aforementioned disadvantages, air injection devices have not found widespread use in the art, even in view of the fact that the national attention is now directed to the efficient burning of gasoline products in automobiles and trucks.

Therefore it is an object of this invention to provide an apparatus which overcomes the aforementioned inadequacies of the prior art devices and provides an improvement which is a significant contribution to the advancement of the pertinent art.

Another object of this invention is to provide a gasoline saving device for an internal combustion engine having a plurality of fluid channels extending longitudinally through a plate member adapted for mounting a carburetor and a manifold housing for providing fluid communication for an external fluid adjacent an outer surface of the plate member to an internal orifice of the manifold housing.

Another object of this invention is to provide a gasoline saving device for an internal combustion engine including venturi means established in proximity to an aperture in the plate member for drawing the external fluid through the fluid channels into the internal orifice of the manifold housing upon gasoline fluid flow therein to mix the external fluid with the gasoline.

Another object of this invention is to provide a gasoline saving device for an internal combustion engine including means for circulating the gasoline fluid about an axis extending along the internal orifice of the manifold housing to facilitate mixing of the gasoline fluid with the injected fluid.

Another object of this invention is to provide a gasoline saving device for an internal combustion engine having a projection surface formed at an obtuse angle with an internal surface of the internal orifice of the carburetor housing and spiral groove means on the projection surface for providing a spin to the gasoline fluid within the internal orifice of the manifold housing.

Another object of this invention is to provide a gasoline saving device for an internal combustion engine comprising a plate member, a venturi and a sleeve member securable to one another and adapted for insertion between the carburetor housing and the manifold housing of the internal combustion engine.

Another object of this invention is to provide a gasoline saving device for an internal combustion engine adapted for mounting relative to plural carburetor internal orifices and plural manifold internal orifices with means for inducing a clockwise spin to the gasoline fluid in one of the manifold internal orifices and for inducing a counterclockwise spin to the gasoline fluid in the other of the manifold internal orifices.

Another object of this invention is to provide a gasoline saving device for an internal combustion engine which is effective in raising the combustion performance of the internal combustion engine and provides a substantial improvement in gasoline economy of conventional internal combustion engines in automobiles, trucks, tractors, etc.

Another object of this invention is to provide a gasoline saving device for an internal combustion engine which is simple and easy to manufacture and is mountable between the carburetor housing and the manifold housing without modification thereto.

Other objects and a fuller understanding of this invention may be had by referring to the summary of the invention, the detailed description and the claims, taken in conjunction with the accompanying drawings.

SUMMARY OF THE INVENTION

The invention may be incorporated into a gasoline saving device for an internal combustion engine having a carburetor housing and a manifold housing. Each of the carburetor and manifold housings have an internal orifice for passing a gasoline fluid. The invention comprises a substantially flat plate member adapted for insertion between the carburetor housing and the manifold housing. The plate member comprises aperture means having a cross-sectional area in accordance with the cross-sectional area of the internal orifices of the carburetor housing and the manifold housing. Means are provided for registering the aperture means of the plate member relative to the internal orifices of the carburetor housing and the manifold housing. A plurality of plate fluid channel means extend longitudinally through the plate member for providing fluid communication for an external fluid such as air adjacent an outer surface of the plate member with the aperture means of the plate member. A venturi is established in proximity to the aperture means for drawing the external fluid through the plate fluid channel means into the internal orifice of the manifold housing upon gasoline fluid flow therein. Accordingly, the injected fluid is drawn through the venturi means to mix with the gasoline fluid providing a superior combustion within the engine.

In one embodiment of the invention, means are provided for circulating the gasoline fluid about an axis extending along the internal orifice of the manifold housing. More specifically, the venturi may include a projection extending into the orifice of the manifold housing. The projection forms an obtuse angle with an internal surface of the internal orifice of the carburetor housing. The projection includes a projection surface having spiral groove means thereon for inducing a spin to the gasoline fluid within the internal orifice of the manifold housing. In still another embodiment of the invention, the aperture means on the plate member includes a first and a second aperture for cooperation with a first and a second carburetor internal orifice and a first and a second manifold internal orifice, respectively. Means are provided for inducing a clockwise spin to the gasoline fluid in the first manifold internal orifice and for inducing a counterclockwise spin to the gasoline fluid in the second manifold internal orifice.

The plurality of fluid channel means includes a first and a second fluid channel communicating in a substantially tangential relationship with the outer perimeter of the aperture means for further inducing a spin to the gasoline fluid flow within the internal orifice of the manifold housing. More specifically, the plate fluid channels may be in fluid communication with venturi fluid channels in the venturi means. The plate and venturi fluid channels may have a first and a second cross-sectional area, respectively. The first cross-sectional area is substantially greater than the second cross-sectional area, with the plate fluid channel means communicating directly with the outer surface of the plate member and with the venturi fluid channel means communicating with the internal orifice of the manifold housing. The venturi fluid channel means is established at an angle relative to an axis of the manifold housing orifice for providing a spin to the gasoline fluid in the manifold housing. The angle may include a compound angle formed in two dimensions relative to the substantially flat plate member.

In a specific example of the invention, the device includes a plate member, a venturi member, and a sleeve member adapted for press fit interconnection. The venturi is adaptable to a large number of carburetor devices by interchanging the venturi and the sleeve member with various plate members adapted for mounting between the specific carburetor housing and the manifold housing.

This invention accordingly comprises an apparatus possessing the features, properties and the relation of elements which will be exemplified in the apparatus hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawing in which.

Similar reference characters refer to similar parts throughout the several views of the drawings.

DETAILED DESCRIPTION

Figure 1:
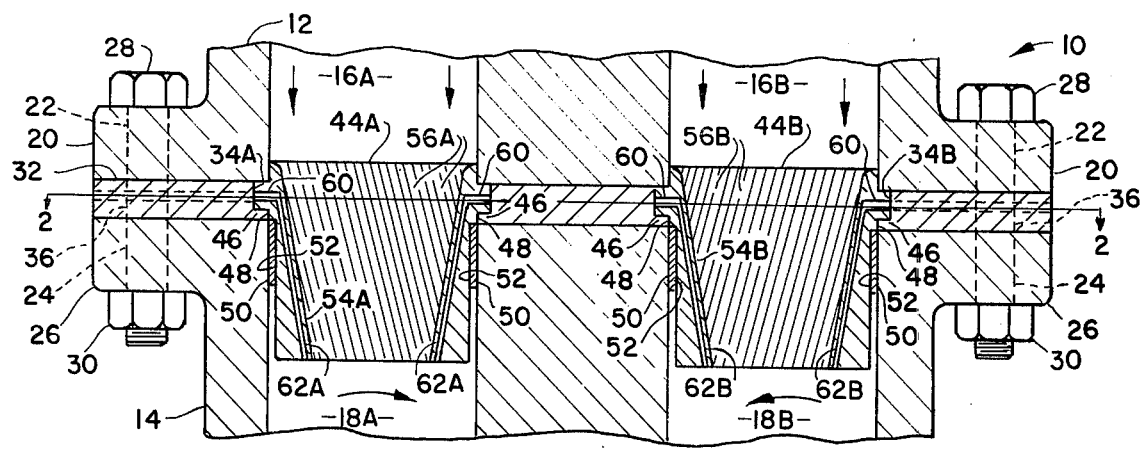
FIG. 1 is a side sectional view of a gasoline saving device mounted between a carburetor housing and a manifold housing of an internal combustion engine taken along line 1—1 in FIG. 2.
Figure 2:
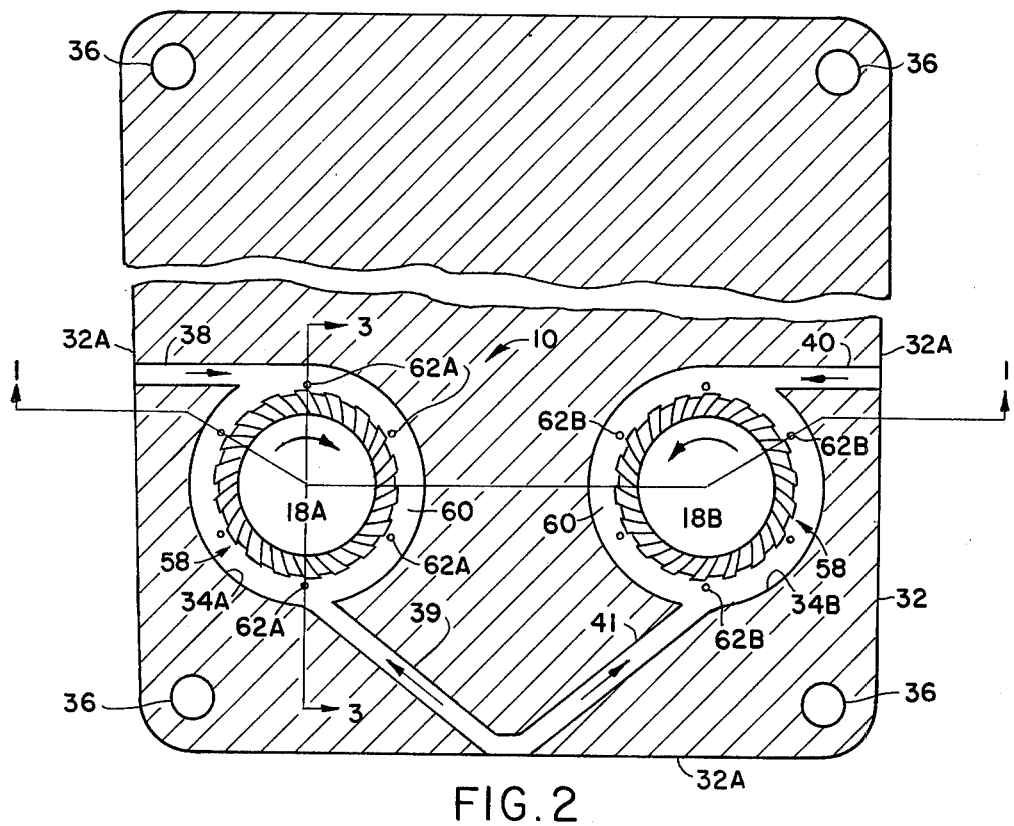
FIG. 2 is a sectional view along line 2—2 of the gasoline saving device shown in FIG. 1.
Figure 3:
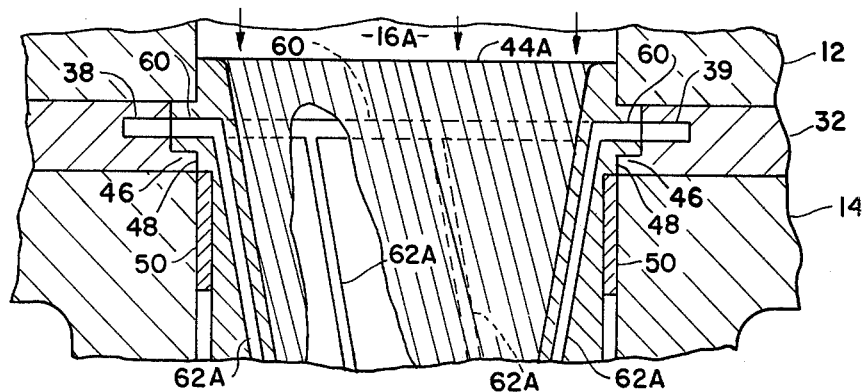
FIG. 3 is an enlarged sectional view along line 3—3 of a portion of the gasoline saving device shown in FIG. 2.

FIGS. 1-3 illustrate a gasoline saving device 10 for an internal combustion engine (not shown) having a carburetor housing 12 and a manifold housing 14. The carburetor and manifold housings 12 and 14 each have internal orifices 16 and 18, respectively, for passing in the direction shown by the arrows, a gasoline fluid comprising gasoline vapors and air. The carburetor and manifold housings 12 and 14 are shown having plural internal carburetor orifices 16A and 16B and plural internal manifold orifices 18A and 18B, respectively. However, it is understood that the invention is suitable for use with single, dual, or four orifice carburetors.

The carburetor housing 12 includes a flange 20 having through apertures 22 aligned with through apertures 24 in a flange 26 of the manifold housing 14. Bolts 28 and nuts 30 secure the carburetor housing 12 to the manifold housing 14 with the carburetor internal orifice 16 aligned with the manifold internal orifice 18 as is well known in the art.

The invention includes a substantially flat plate member 32 adapted for insertion between the carburetor housing 12 and the manifold housing 14. The plate member 32 has aperture means shown as a first and a second aperture 34A and 34B each having a cross-section in accordance with the cross-section of the internal orifices 16 and 18 of the carburetor and manifold housings 12 and 14, respectively. A plurality of through holes 36 are formed in the plate member 32 for receiving bolts 28 to register the apertures 34A and 34B of the plate member 32 relative to the internal orifices 16 and 18 of the carburetor and manifold housing 12 and 14.

A plurality of plate fluid channel means shown as fluid channels 38-41 extend longitudinally through the plate member 32. The fluid channel means 38-41 provide fluid communication for an external fluid such as air adjacent outside surfaces 32A with the apertures 34A and 34B of the plate member 32. Each of the apertures include a first and a second channel communicating in a substantially tangential relationship with the outer perimeter of the apertures 34A and 34B for inducing a spin to the gasoline fluid within the internal orifices 18A and 18B of the manifold housing 14 as will be hereinafter explained.

Venturi means 44 including a first and a second venturi 44A and 44B are secured to the aperture means 34A and 34B for drawing the external fluid through the plate fluid channel means 38-41 into the internal orifices 18A and 18B of the manifold housing 14. In this embodiment, the plate member 32 has a protrusion 46 which cooperates with a recess 48 in the venturi means 44 in a press fit engagement. A substantially cylindrical sleeve 50 selected to conform with the internal cross-section of the manifold internal orifice 18A and 18B is receivable in a second recess 52 of the venturi means 44. The first and second recesses 48 and 52 in cooperation with sleeve 50 and plate member 32 secure the venturi means 44A and 44B to extend into both the carburetor orifices 16A and 16B and the manifold orifices 18A and 18B.

The first and second venturi means 44A and 44B include venturi surfaces 54A and 54B forming an obtuse angle with an internal surface of the internal orifices 16A and 16B of the carburetor housing 12. The projection surfaces 54A and 54B include spiral groove means 56A and 56B for providing a spin to the gasoline fluid within the internal orifices 18A and 18B of the manifold housing 14 as indicated by the arrows. As more clearly shown in FIG. 2, the spiral grooves 56A of first venturi 44A induce a clockwise spin to the gasoline fluid in the first manifold internal orifice 18A whereas the spiral grooves 56B of the second venturi means 44B induce a counterclockwise spin to the gasoline fluid in the second manifold internal orifice 18B.

The venturi means 44 includes venturi fluid channel means shown in general as 58 which comprises an annular passage 60 communicating with the plate fluid channel means 38–41. The venturi fluid channel means 58 also includes a plurality of venturi jets 62A and 62B for the first and second venturi means 44A and 44B, respectively. The venturi jets 62A are shown as forming a first angle with the plate member 32 in FIG. 1 and forming a second angle with the plate 32 in FIG. 2. Accordingly, the venturi jets 62A and 62B form compound angles with the plate member 32. The first angle directs the external air toward the inner portion of the manifold orifices 18A and 18B as shown in FIG. 1 The second angle enables the external air to induce a spin to the gasoline fluid as shown by the angular displacement of the jets in FIG. 2. FIG. 3 shows in greater detail the interrelation between the plate fluid channel means 38 and 39, the annular passage 60, and the venturi jets 62A. It should be appreciated that the venturi jets 62A induce a clockwise rotation of the gasoline fluid in the first manifold orifice 18A whereas the venturi jets 62B induce a counter-clockwise rotation of the gasoline fluid in the second manifold orifice 18B. In this embodiment, the venturi jets 62A and 62B are shown cooperating with the spiral grooves 56A and 56B for inducing a similar spin to the flowing gasoline fluid in the first and second manifold internal orifices 18A and 18B.

The foregoing description has described a gasoline saving device 10 for mounting between the carburetor and the manifold assembly which injects additional fluid such as air into the internal combustion engine prior to ignition. The device induces a spin to the flowing gasoline, further resulting in a superior gasoline-air mixture. The device 10 includes no moving parts and can be readily fabricated from three parts. The venturi means 44A and 44B may be universal structures which are press-fitted into different plate members 32 to accommodate for different carburetor and manifold housings.

The aforementioned invention can be incorporated into the body of the carburetor so that the plate 32 would not be required because the fluid channels 38–41 would be constructed into the casting of the carburetor to provide this fluid to be drawn from the air filter.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described:
What is claimed is:

1. A gasoline saving device for an internal combustion engine having a carburetor housing and a manifold housing, each housing having an internal orifice for passing a gasoline fluid, comprising in combination:
   a substantially flat plate member adapted for insertion between the carburetor housing and the manifold housing;
   said plate member comprising aperture means having a diameter in accordance with the cross-section of the internal orifices of the carburetor housing and the manifold housing;
   means for registering said aperture means of said plate member relative to the internal orifices of the carburetor housing and the manifold housing;
   a plurality of plate fluid channel means extending longitudinally through said plate member for providing fluid communication for an external fluid adjacent an outer surface of said plate member with said aperture means of said plate member;
   venturi means established in proximity to said aperture means for drawing the external fluid through said fluid channel means into the internal orifice of the manifold housing upon gasoline fluid flow therein to mix the external fluid with the gasoline fluid;
   said aperture means of said plate member including a first and a second aperture for cooperation with first and second carburetor and manifold internal orifices, respectively;
   means for inducing a clockwise spin to the gasoline fluid in the first manifold internal orifice and for inducing a counterclockwise spin to the gasoline fluid in the second manifold internal orifice;
   said substantially flat plate member including attachment means for securing said venturi means; and
   sleeve means disposed within the internal orifice of the manifold and cooperating with said venturi means and said plate member for positioning said venturi means in the internal orifices of the manifold housing.

2. An apparatus as set forth in claim 1, wherein said plurality of plate fluid channel means includes a first and a second channel communicating in a substantially tangential relationship with the outer perimeter of said aperture means for aiding the spin to the gasoline fluid within the internal orifice of the manifold housing.

3. An apparatus as set forth in claim 1, wherin said venturi means includes a projection extending into the orifice of the manifold housing;
   said projection forming an obtuse angle with the internal surface of the internal orifice of the carburetor housing.

4. An apparatus as set forth in claim 1, wherein said venturi means includes venturi fluid channel means in fluid communication with said plate fluid channel means;
   said plate and venturi fluid channel means having a first and a second cross-sectional area, respectively; and
   said first cross-sectional area being substantially greater than said second cross-sectional area.

5. An apparatus as set forth in claim 4, wherein said plate fluid channel means communicates directly with said outer surface of said plate member and wherein said venturi fluid channel means communicates directly with the internal orifice of said manifold housing.

6. An apparatus as set forth in claim 1, wherein said venturi means includes a projection surface forming an obtuse angle with an internal surface of the internal orifice of the carburetor housing; and spiral groove means on said projection surface for providing a spin to the gasoline fluid flow within the internal orifice of the manifold housing.

7. An apparatus as set forth in claim 6, wherein said projection surface extends into the internal orifices of the carburetor housing and the manifold housing.

8. An apparatus as set forth in claim 1, wherein said venturi means is securable relative to said aperture means of said plate member.

9. An apparatus as set forth in claim 1, wherein said venturi means includes venturi fluid channel means in fluid communication wth said plate fluid channel means;

said venturi fluid channel means being established on an angle relative to an axis of the manifold housing orifice for providing a spin to the gasoline fluid in the manifold housing.

10. An apparatus as set forth in claim 9, wherein said angle includes an angle in two dimensions relative to said substantially flat plate member.

11. An apparatus as set forth in claim 1, wherein said substantially flat plate member includes attachment means for securing said venturi means.

* * * * *

UNITED STATES PATENT AND TRADEMARK OFFICE
CERTIFICATE OF CORRECTION

PATENT NO. : 4,130,099
DATED : December 19, 1978
INVENTOR(S) : Russel O. Ferguson It is certified that error appears in the above-identified patent and that said Letters Patent are hereby corrected as shown below:

Column 1, line 57, after "mounting" insert --between--;

Signed and Sealed this

Fourteenth Day of August 1979

[SEAL]

Attest:

LUTRELLE F. PARKER

Attesting Officer     Acting Commissioner of Patents and Trademarks